United States Patent
Yudanov

(10) Patent No.: US 10,216,454 B1
(45) Date of Patent: Feb. 26, 2019

(54) METHOD AND APPARATUS OF PERFORMING A MEMORY OPERATION IN A HIERARCHICAL MEMORY ASSEMBLY

(71) Applicant: Advanced Micro Devices, Inc., Sunnyvale, CA (US)

(72) Inventor: Dmitri Yudanov, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 15/686,121

(22) Filed: Aug. 24, 2017

(51) Int. Cl.
*G11C 8/00* (2006.01)
*G06F 3/06* (2006.01)
*G06F 12/0868* (2016.01)

(52) U.S. Cl.
CPC .......... *G06F 3/0656* (2013.01); *G06F 3/061* (2013.01); *G06F 3/068* (2013.01); *G06F 3/0685* (2013.01); *G06F 12/0868* (2013.01)

(58) Field of Classification Search
CPC ........ G06F 3/0656; G06F 3/061; G06F 3/068; G06F 3/0685; G06F 12/0868
See application file for complete search history.

(56) References Cited

U.S. PATENT DOCUMENTS

| | | | | |
|---|---|---|---|---|
| 6,212,599 | B1 * | 4/2001 | Baweja | G06F 1/3225 365/226 |
| 7,584,321 | B1 * | 9/2009 | Malachowsky | G06F 13/1684 345/531 |
| 8,122,186 | B2 * | 2/2012 | Lim | G11C 7/22 711/105 |
| 2009/0216926 | A1 * | 8/2009 | Matulik | G06F 13/4243 710/107 |

* cited by examiner

*Primary Examiner* — Pho M Luu
(74) *Attorney, Agent, or Firm* — Volpe and Koenig, P.C.

(57) ABSTRACT

A method and apparatus of performing a memory operation includes receiving a memory operation request at a first memory controller that is in communication with a second memory controller. The first memory controller forwards the memory operation request to the second memory controller. Upon receipt of the memory operation request, the second memory controller provides first information or second information depending on a condition of a pseudo-bank of the second memory controller and a type of the memory operation request.

22 Claims, 9 Drawing Sheets

METHOD AND APPARATUS OF PERFORMING A MEMORY OPERATION IN A HIERARCHICAL MEMORY ASSEMBLY

STATEMENT REGARDING FEDERALLY SPONSORED RESEARCH

This invention was made with Government support under FastForward-2 Memory Technology (MT) Project with Lawrence Livermore National Laboratory (Prime Contract No. DE-AC52-07NA27344, Subcontract No. B608045) awarded by DOE. The Government has certain rights in this invention.

BACKGROUND

Extending capacity of a memory system is an important feature that allows running larger applications. However, there are different types of memory technologies (e.g., dynamic random access memory (DRAM), phase-change memory (PCM), Flash memory, static random access memory (SRAM), among others), that have different characteristics, such as capacity and latency. For example, high speed memories such as SRAM or DRAM memories do not have as extensive a capacity as slower speed high capacity memories such as PCM or Flash memories.

Accordingly, it is difficult using conventional techniques to connect, (e.g., stack), various memory types together in a hierarchical manner that allows them to communicate with one another and access memory in memory banks of one another. Additionally, using conventional techniques, it is difficult to have a hierarchical memory stack that appears as a unified memory space that addresses target latencies and bandwidths required for performing memory access operations.

BRIEF DESCRIPTION OF THE DRAWINGS

A more detailed understanding can be had from the following description, given by way of example in conjunction with the accompanying drawings wherein.

DETAILED DESCRIPTION

As mentioned above, there are numerous different memory technologies (e.g., dynamic random access memory (DRAM), phase-change memory (PCM), Flash memory, static random access memory (SRAM), among others), that have different characteristics, such as capacity and latency. Each memory technology has its own niche. For example, mobile devices or notebook computers widely utilize fast non-volatile memory technologies. Graphics applications benefit from high bandwidth memory technologies. Additionally, stand-alone memory products such as non-volatile dual in-line memory modules (NVDIMMs) and hybrid memory stacks have their own differing characteristics. Heterogeneous scaling (e.g., increasing the number of memory technologies) allows multiple memory types to appear integrated as a single unified memory space that runs at a target latency. By scaling up, multiple layers of heterogeneous memories ranging from very fast to very slow can utilize the same channel. Accordingly, the number of available channels can be increased as well as the bandwidth.

Although a more detailed description of the method and apparatus will be described below, briefly, slower memory technologies are located "behind" faster ones and have their capacity visible via special buffers, (i.e., "pseudo-banks"), that emulate fast memory banks at the capacity of slow memory. Additionally, latency overheads for memory reads/writes are reduced by the implementation of pre-fetching of data, predicting data return, and timing feedback.

A method of performing a memory operation is disclosed. The method includes receiving a memory operation request at a first memory controller that is in communication with a second memory controller. The first memory controller forwards the memory operation request to the second memory controller. Upon receipt of the memory operation request, the second memory controller provides first information or second information depending on a condition of a pseudo-bank of the second memory controller and a type of the memory operation request.

An apparatus is disclosed. The apparatus includes a first memory controller, a second memory controller in communication with the first memory controller, and at least one pseudo-bank associated with the second controller. The first memory controller receives a memory operation request and forwards the memory operation request to the second memory controller. The second memory controller provides first information or second information depending on a condition of a pseudo-bank of the second memory controller and a type of the memory operation request.

Figure 1:
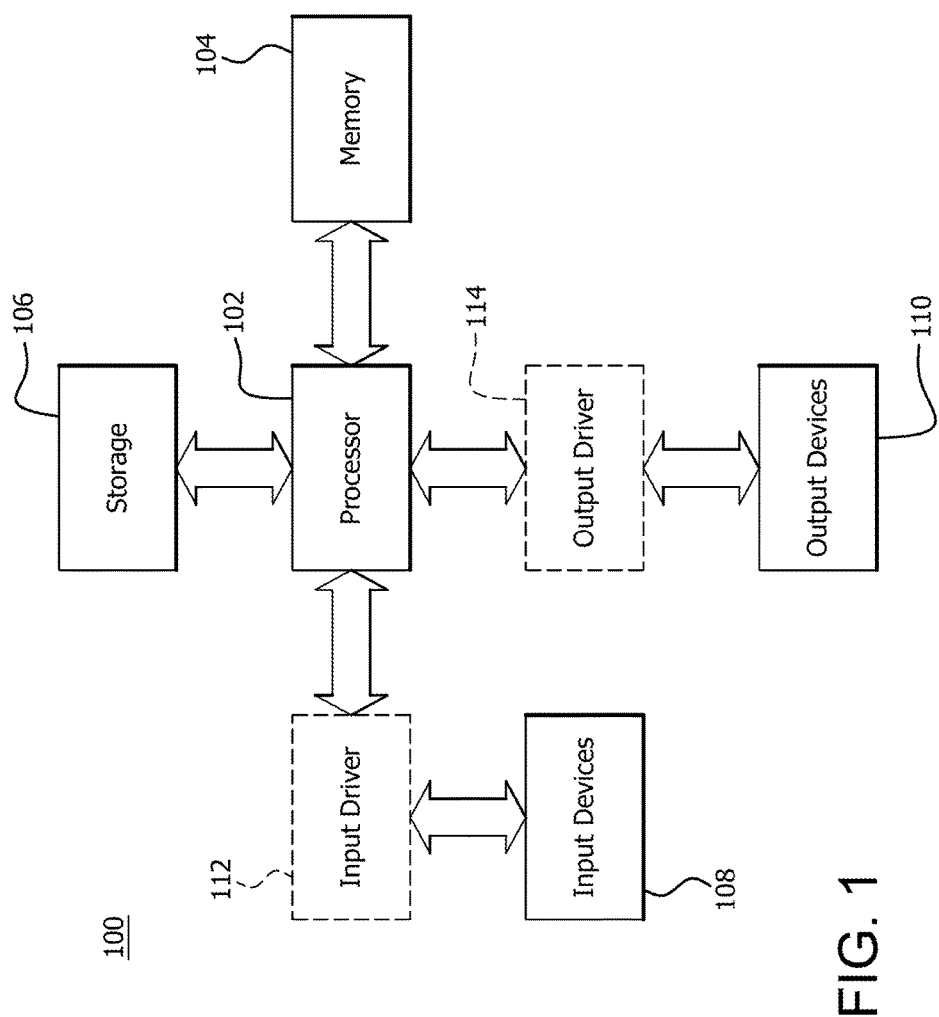
FIG. 1 is a block diagram of an example device in which one or more disclosed embodiments can be implemented.

FIG. 1 is a block diagram of an example device 100 in which one or more disclosed embodiments may be implemented. The device 100 may include a computer, for example, a desktop computer, a tablet computer, a gaming device, a handheld device, a set-top box, a television, or a mobile phone. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a GPU, a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM (DRAM), or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. Although described embodiments include a main display, the invention may be practiced without a main display. In this way, the control territory may be an office environment with a plurality of portable devices and no main display.

Figure 2:
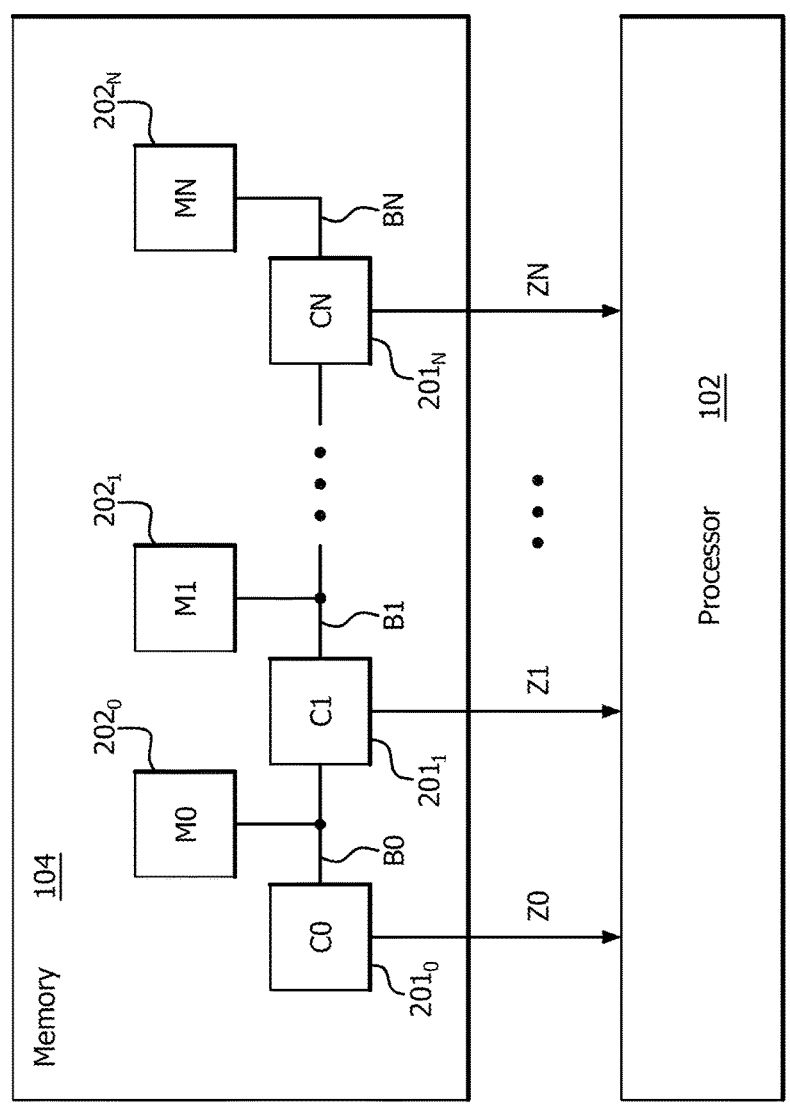
FIG. 2 is a block diagram of an example structure of a processor in communication with a memory in which one or more features of the disclosure can be implemented.

FIG. 2 is a block diagram of an example structure of a processor (e.g., processor 102) in communication with a memory (e.g., memory 104) in which one or more features of the disclosure can be implemented. As depicted in FIG. 2, the memory 104 includes a plurality of controllers C0, C1, . . . , CN (designated $201_0$, $201_1$, . . . , $201_N$) and a plurality of associated memory segments M0, M1, . . . , MN (designated $202_0$, $202_1$, . . . , $202_N$). That is, controller C0 controls memory segment M0 via controller bus B0. Controller C1 controls memory segment M1 via controller bus B1, and so on. The processor 102 is in communication with the controllers C0-CN via respective system bus connections Z0-ZN, in the example shown in FIG. 2. However, processor 102 can communicate with just controller C0 and have access to the memory capacity of the entire chain M0-MN. Additionally, with the exception of controller CN, each controller 201 is in communication with a next controller in line via a bus. For example, controller C0 is in communication with controller C1 via controller bus B0, and so on. In an example implementation, memory segment M0 is DRAM, memory segment M1 is PCM, and the controller buses B0-BN are double data rate (DDR) buses.

Figure 3B:
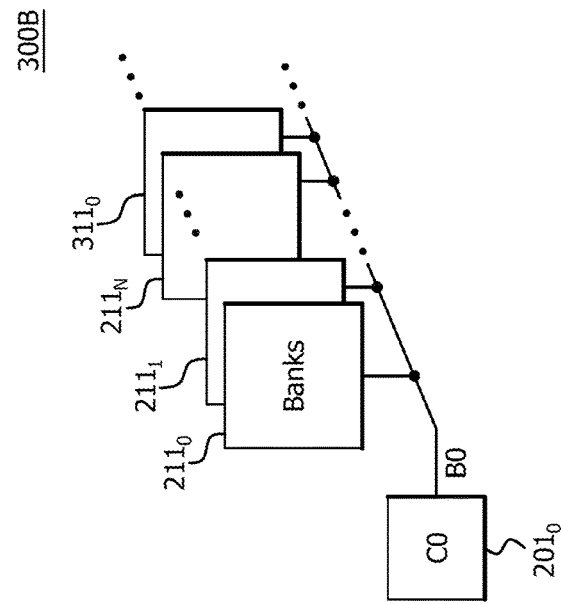
FIG. 3B is an alternative block diagram of the example hierarchical memory assembly depicted in FIG. 3A.
Figure 3A:
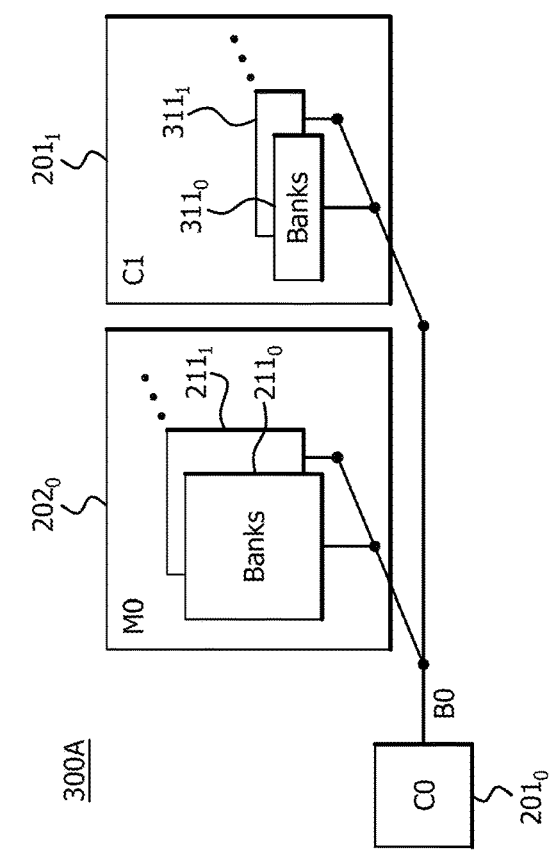
FIG. 3A is a block diagram of an example hierarchical memory assembly.

FIG. 3A is a block diagram of an example hierarchical memory assembly 300A. Although FIG. 3A depicts only two controllers C0 and C1 from FIG. 2, it is applicable to the additional controllers shown in FIG. 2 as well. The assembly 300A shows a depiction of a perspective of the memory assembly as viewed from controller C0. As shown in FIG. 3A, the controller C0 is in communication with memory segment M0 and controller C1 over controller bus B0. Memory segment M0 is shown for example purposes to include memory banks $211_0$ and $211_1$, however it should be understood that additional memory banks (not shown) can also be included in memory segment M0. In a similar way, controller C1 includes an area dedicated to emulating memory banks in controller C1's associated memory segment M1 which is connected to C1 over bus B1 as described above in FIG. 2. That is, controller C1 includes, for example, what may be referred to as pseudo-banks $311_0$ and $311_1$, although it should be understood that additional pseudo-banks can be included in the controller C1. The pseudo-banks 311 are buffers in controller C1 (e.g., SRAM buffers) that are assigned by control logic in controller C1. The visible interface to that buffer is controller bus B0 such that the pseudo-banks 311 appear to controller C0 as memory rows and columns of memory M1. However, the control logic of controller C1 translates the visible interface into the cache-like organization of the buffer (e.g., 64B cache lines), as the control logic of C1 has knowledge of the memory communication protocol of bus B0.

Accordingly, from the perspective of controller C0, the memory banks 211 in memory segment M0 and the pseudo banks 311 emulating memory M1 appear as a unified, or flat, memory space along controller bus B0. The capacity of that space is the capacity of memory M0 plus the capacity of memory M1. This perspective is shown in FIG. 3B, which is a logical block diagram 300B of the example hierarchical memory assembly depicted in FIG. 3A as seen by controller C0. Controller C0 communicates with both memory segment M0 and pseudo-banks 311 utilizing the memory communication protocol of controller bus B0, irrespective of the type of memory technology of memory segment M1. It should be noted that there may be additional memory segments (e.g., M2, . . . , MN) in the chain along controller bus B0 to extend the memory capacity of each channel on controller bus B0. That is, if additional memory segments are included, then controller C0 also sees those memory segments along bus B0 as pseudo-banks.

From a high-level viewpoint, the memory arrangement described in FIGS. 3A and 3B resembles a "waterfall", where data cascades from memory technology segments that are slower technologies (e.g., M1 and higher) toward faster memory technology segments, such as M0, controlled by controller C0. The cascading waterfall can be implemented in a number of different topologies, several examples of which are described herein.

Figure 4A:
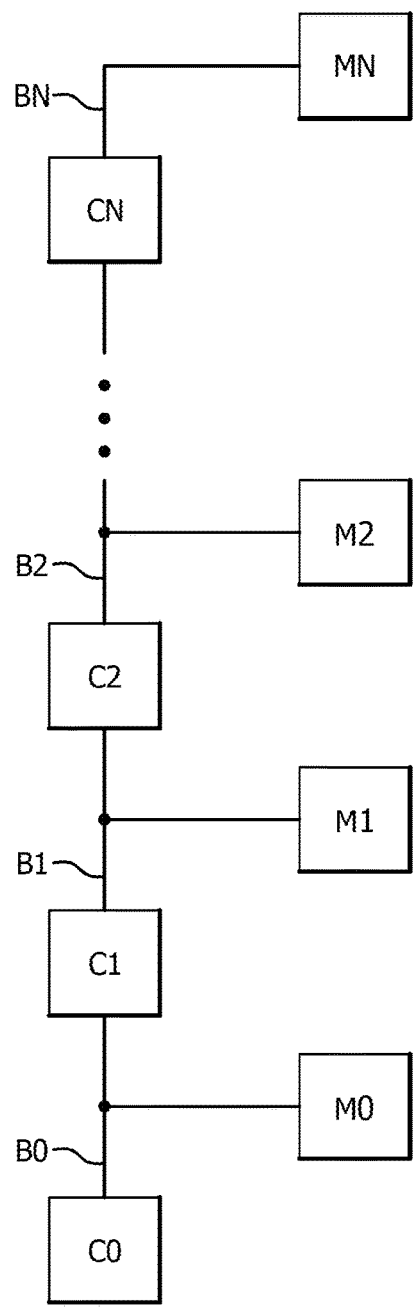
FIG. 4A is a block diagram of an example hierarchical memory assembly arranged in a first configuration.

FIG. 4A is a block diagram of an example hierarchical memory assembly 400A arranged in a first configuration. In the topology of the first configuration, the assembly 400A may be described as a staircase. That is, each controller 201 is in communication with a next controller in the chain over a single controller bus. For example, controller C0 communicates with controller C1 via controller bus B0. Controller C1 communicates with controller C2 via controller bus B1, and so on, to controller CN, which would have in communication with it controller CN−1 (not shown) over controller bus BN−1 (also not shown).

In the manner shown in FIG. 4A, controller C0 sees the pseudo-banks (e.g., pseudo-banks 311 from FIGS. 3A and 3B) as well as the memory banks of its own associated memory segment M0. Likewise, controller C1 sees the pseudo-banks present in controller C2 as well as its own memory segment M1. Controller C2 sees the pseudo-banks of controller C3 (not shown) and its own memory segment M2, and so on proceeding from controller C2 to controller CN−1. Controller CN, then, sees only its own memory segment MN. The pseudo-banks 311 of controller C1 emulate the memory capacity size of M1+M2+ . . . MN. The pseudo-banks 311 of controller C2 emulate the memory capacity size of M2+M3+ . . . MN and so on. Thus, a set of pseudo-banks 311 in any particular controller emulates the memory capacity of the entire chain behind that controller.

Figure 4B:
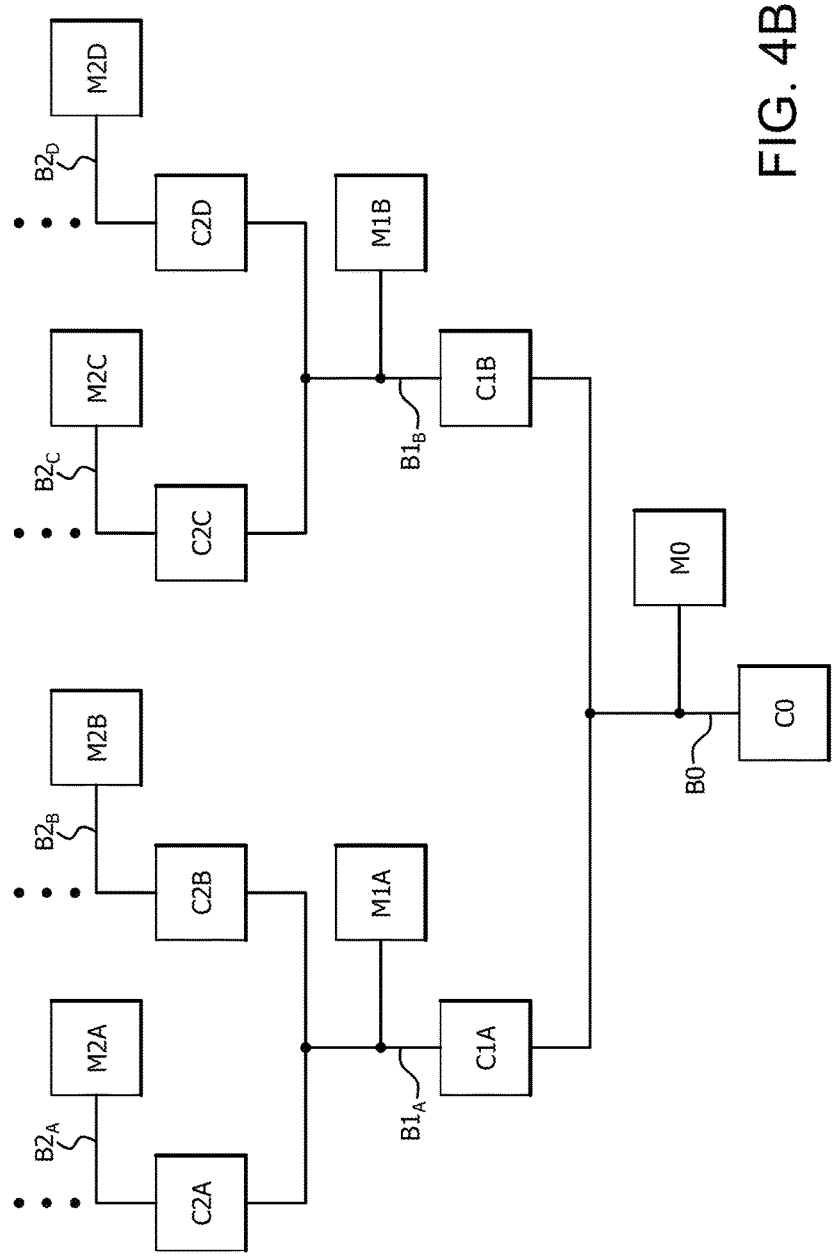
FIG. 4B is a block diagram of an example hierarchical memory assembly arranged in a second configuration.

FIG. 4B is a block diagram of an example hierarchical memory assembly 400B arranged in a second configuration. In the topology of the second configuration, the assembly 400B may be described as a tree. That is, beginning with the first controller C0, each controller is in communication with two additional controllers over its associated controller bus. That is, controller C0 communicates with controllers C1A and C1B over controller bus B0, as well as its own associated memory segment M0. Controller C1A communicates with controller C2A and C2B over controller bus B1A and its own associated memory segment M1A. Controller C1B communicates with controller C2C and C2D over controller bus B1B, as well as its own memory segment M1B. Also, although further controllers 201 are not shown beyond C2A, C2B, C2C and C2D, it is to be understood that additional controllers can be included in the tree topology shown in FIG. 4B. That is, in addition to controllers C2A, C2B, C2C and C2D being in communication with their respective memory segments M2A, M2B, M2C and M2D over their respective controller buses $B2_A$, $B2_B$, $B2_C$, and $B2_D$, they can also be in communication with two additional controllers each.

In this manner, it can be seen in FIG. 4B that each controller is capable of communicating, and seeing, its own memory segment as well as two sets of pseudo-banks in controllers described as above it. For example, controller C0 sees memory segment M0 as well as the pseudo-banks of controllers C1A and C1B. Controller C1A sees its own memory segment M1A as well as the pseudo-banks of controllers C2A and C2B. Controller C1B sees its own memory segment M2A as well as the pseudo-banks of controllers C2C and C2D, and so on. It should be noted that although each controller is shown as being connected to two additional controllers, this is an example and the tree topology can include additional controllers connected to each downstream controller. That is, for example, in addition to controllers C1A and C1B, controller C0 can be connected to a controller C1C, and so on.

Figure 4C:
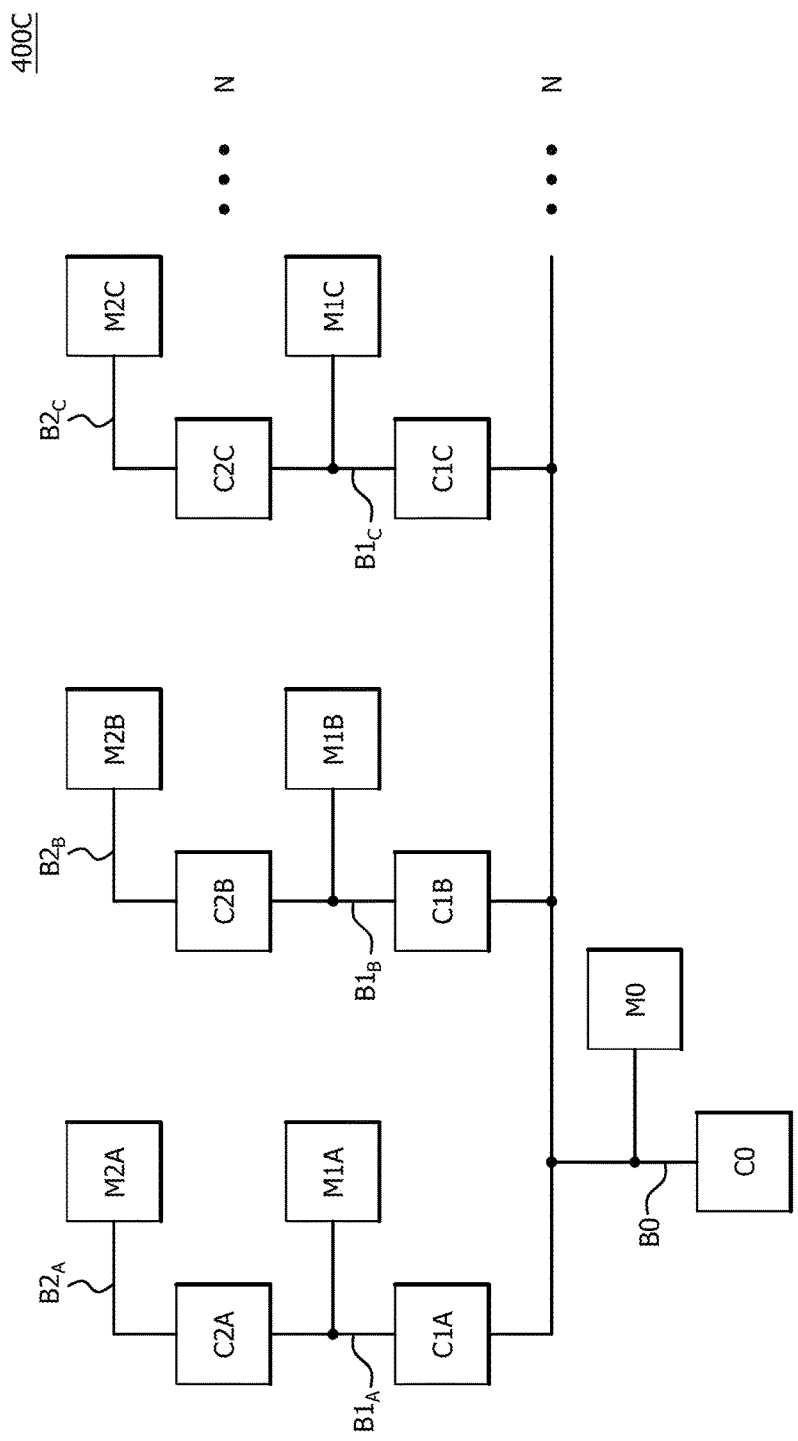
FIG. 4C is a block diagram of an example hierarchical memory assembly arranged in a third configuration.

FIG. 4C is a block diagram of an example hierarchical memory assembly 400C arranged in a third configuration. In the topology of the third configuration, the assembly 400C may be described as a forest. That is, in addition to its own memory segment M0, controller C0 is connected to a plurality of second level controllers (e.g., C1A, C1B, C1C, and so on) via controller bus B0. Each controller at the second level of the forest, such as controllers C1A, C1B and C1C, are connected to their own respective memory segments as well as one additional third level controller.

For example, as shown in FIG. 4C, controller C1A is connected to memory segment M1A as well as controller C2A via controller bus B1A. Controller C1B is connected to memory segment M1B as well as controller C2B via controller bus B1B. Controller C1C is connected to memory segment M1C as well as controller C2C via controller bus $B1_C$. This proceeds in much the same manner from the second level of controllers in FIG. 4C as the staircase topology in FIG. 4A. It should be noted that additional levels of controllers may be included above those shown at the level of the C2 controllers. For example, a layer of C3 controllers (not shown), and so on, could be included in the example topology.

Therefore, in the topology as depicted in FIG. 4C, controller C0 sees the memory banks of its own memory segment M0 as well as the pseudo-banks from of all of the second level controllers (in this case controllers C1A, C1B, and C1C, as well as any additional second level controllers) via controller bus B0. Each second level controller then sees its own memory segment's memory banks and the pseudo-banks of the controller connected to it via its controller bus.

It should also be understood that the topologies depicted above are example topologies, and the methods described herein can be implemented on any of these topologies as well as any other topology not shown by example above.

In any topology each controller in the chain maintains a list of opened and closed rows along its controller bus. For example, controller C0 (e.g., in FIG. 3A) maintains a list of opened and closed rows in memory M0 and the pseudo-banks 311 in controller C1. However, since the pseudo-banks 311 are not actual memory banks, they do not have an actual row/column structure. Accordingly, when controller C0 sends a command to close or open a row in a pseudo-bank 311, it is associated with data residing in that pseudo-bank 3111 but not the actual memory bank of memory M1. Therefore, controller C1 maintains a mapping scheme as to how the pseudo-banks 311 are mapped to the rows in the actual memory segment M1. In order to accomplish this, the data in the pseudo-bank 311 is tagged by pseudo-bank rows mapped to the rows of memory M1. When controller C1 receives a "close row" request on controller bus B0, it marks all data tagged by that row as committed. That data tag is translated to the memory segment M1 row number and the data is scheduled for eviction from the pseudo-bank 311 and written back to memory segment M1. When controller C1 receives an "open row" request on controller bus B0, it prepares a relevant memory segment M1 row for opening.

Figure 5:
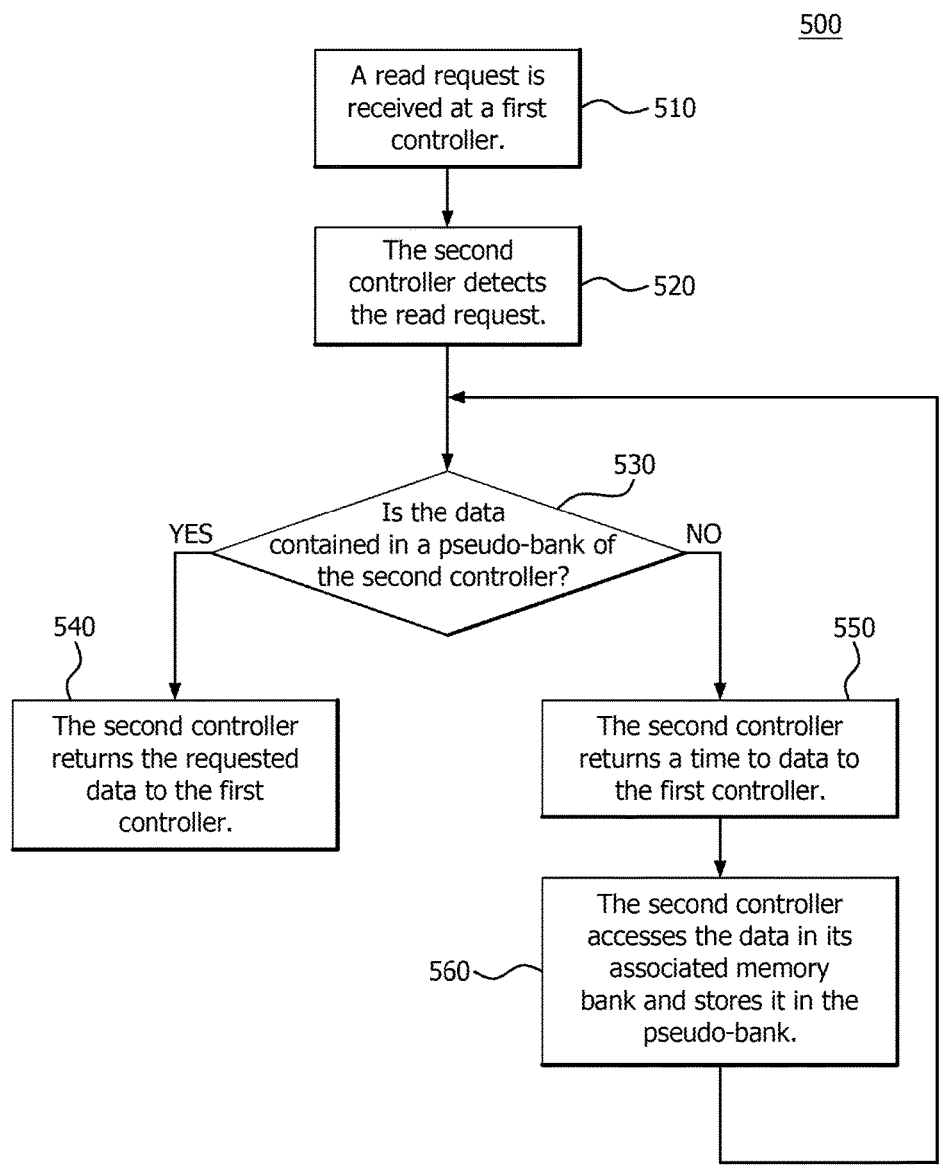
FIG. 5 is a flow diagram of an example method of performing a read operation in an hierarchical memory assembly.

FIG. 5 is a flow diagram of an example method 500 of performing a read memory operation in a hierarchical memory assembly, such as any of the example memory assemblies depicted above. For purposes of this example, controller C0 does not distinguish between banks of memory M0 and pseudo-banks emulating memory M1. Memory address ranges of M0 and M1 can be interleaved, striped, augmented or have any other pre-determined conventional address allocation scheme. Thus, a portion of data structure allocated within the M0+M1 memory space can exist in either of these memory spaces, but not both (i.e., they are mutually exclusive). Should controller C0 be able to distinguish between addresses belonging to M0 and M1 its read/write operations could be optimized for the respective memory. In this case, C0 could implement caching of some M1 subspace into M0 and overcome mutual exclusivity. However, the example described herein relates to a generic case.

In step 510, a read command is received at a first controller. For example, the read command can be received by controller C0 in any one of the topologies depicted above from a requester, for example from a processor, such as processor 102 depicted in system 100. If the data address falls within the memory segment associated with the first controller (e.g., M0), then the data is returned by memory M0 and not returned by the second controller C1.

If the data address belongs to the memory segment M1, then the second controller immediately detects it (step 520). There are two possibilities in this case. One possibility is that the data exists in the pseudo-bank of the second controller. The second possibility is that the data is not present in the pseudo-bank of the second controller. Therefore, in step 530, it is determined whether the data is contained in the pseudo-bank of the second controller.

If the data is contained in the pseudo-bank of the second controller (step 530), then the second controller returns the data to the first controller (step 540) in the same manner as data being returned as if it were contained in memory M0. If the data is not present in the pseudo-bank of the second controller (step 530), then the second controller returns a time to data (e.g., as a bit vector) to the first controller (step 550). That is, for example, the second controller returns the time stamp that the data is expected to be available in its pseudo-bank in the future. The time to data is calculated by logic in the second controller and that information is placed in the pseudo-bank and returned on data I/O pins of the controller bus instead of the actual data.

The time to data is calculated by the second controller based upon a number of factors. Some example factors are whether the data is in the memory segment controlled by the second controller or in an upstream memory segment, whether the second controller is required to open or close rows in the memory segment, whether the second controller is required to evict data from the pseudo-bank in order to create memory space for the data. In the case where the second controller has to retrieve the data from an upstream (e.g., third controller's pseudo-bank) the second controller can return an expected time for the time to data information being available. That is, since the second controller is not able to provide a time to the data being available, it returns a time to the first controller letting the first controller know when it can retrieve an expected time to data. Since the first controller is not aware whether it is receiving data or the time to data (e.g., metadata) the difference can be signaled by the second controller via a separate wire along the bus or can include a special format for the time data that indicates the returned data is actually time to data. The first controller can utilize the same wire to indicate back to the second controller whether or not it desires to accept the time return or is going to cancel the request. In this case the second controller may avoid placing that time on I/O bus pins, therefore saving the bus use for other activities.

In the case where the second controller has the data in its memory segment banks, the second controller accesses the data and places it in its pseudo-bank (step 560). The first controller comes back to access the data at the time indicated in the time to data that it received earlier (i.e., returns to step 530). In the case where the second controller has provided a time to the time to data, the first controller can return to receive the time to data, and subsequently the data itself over several request iterations.

Figure 6:
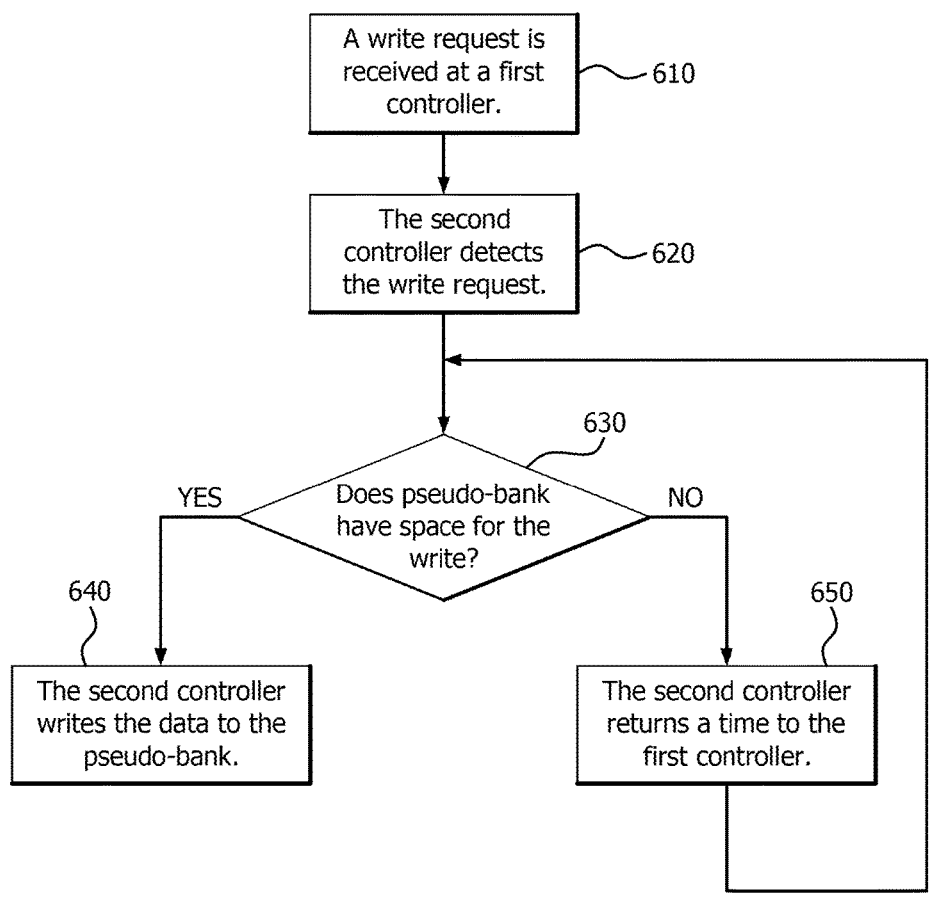
FIG. 6 is a flow diagram of an example method of performing a write operation in an hierarchical memory assembly.

FIG. 6 is a flow diagram of an example method 600 of performing a write operation in a hierarchical memory assembly, such as any of the example memory assemblies depicted above. In step 610, a write command is received at a first controller. For example, the write command can be received by controller C0 in any one of the topologies depicted above from a requester, for example a processor such as processor 102 depicted in system 100. If the data address falls within the memory segment associated with the first controller (e.g., M0), then the data is written to memory M0 and not written to a pseudo-bank in the second controller.

However, if the data address does not fall within the memory segment associated with the first controller (e.g., M0), then in step 620, the second controller detects the write request and requested address to be written (as that address allocation is predetermined). At this point, there are two scenarios: (1) the pseudo-bank has space to accommodate the data in the write request, and (2) the pseudo-bank does not have space to accommodate the data in the write the request. Accordingly, the second controller determines whether or not the pseudo-bank has room for the data in the write request (step 630).

If there is space in the pseudo-bank, then the second controller routes the data from the first controller to the selected pseudo-bank (step 640). This is performed in accordance with the memory technology protocol of controller bus B0. If there is no space in the pseudo-bank to perform the data write (step 630), then the second controller returns a time to the first controller (step 650). The notification that the pseudo-bank in the second controller does not have space can be immediately transmitted by the second controller on a separate wire of the controller bus (e.g., B0). The first controller can also use this wire to signal back to the second controller whether it is going to accept or cancel the return of time in the response of its write request. The time can be returned on the same data wires that the first controller uses for sending the data to be written to pseudo-banks should it not receive the signal from the second controller about unavailability of space in the pseudo-banks. If the first controller accepts the return of time and once the first controller has the time indicating when it can come back and repeat the request, the first controller can come back at that time with the same or a different write request (i.e., returns to step 630).

Figure 7:
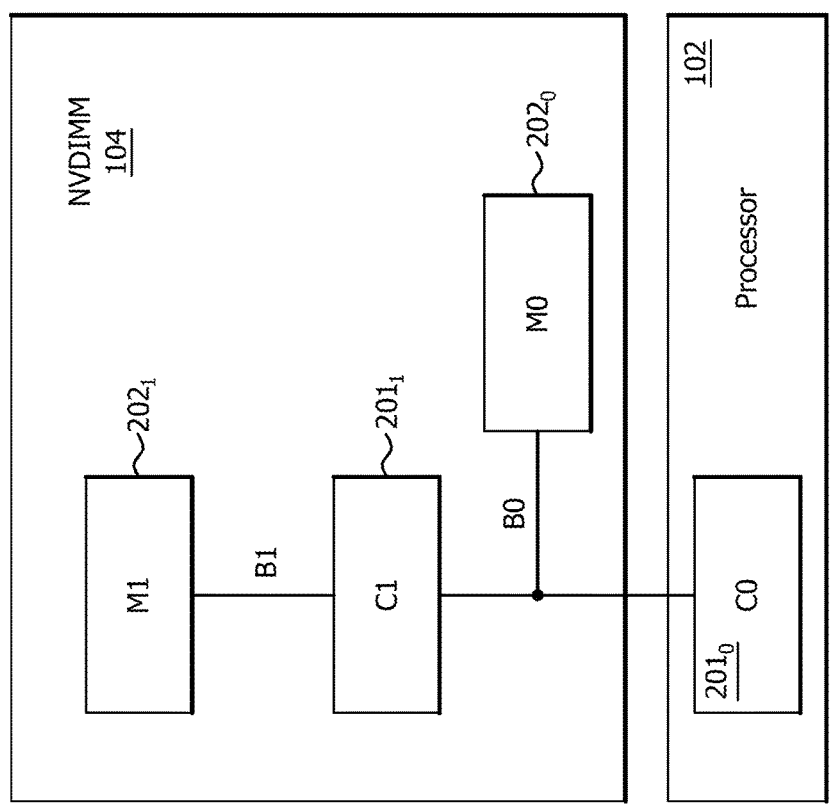
FIG. 7 is a block diagram of an example two level hierarchical memory assembly.

Further, the methods described above can be implemented in a single level or multiple level hierarchical memory assembly. FIG. 7 is a block diagram of an example two level hierarchical memory assembly 700. As shown in FIG. 7, the first controller C0 resides in a processor, such as processor 102 of system 100. Memory segment M0, controller C1, and memory segment M1 reside separately on a memory module. In the example shown in FIG. 7, the memory module is shown as memory 104, which in this example is a non-volatile dual in-line memory module (NVDIMM). In this example assembly 700, controller C0 is in communication with memory segment M0 and controller C1 (and therefore its pseudo-banks) via the controller bus B0.

Although methods and apparatuses described above show a technique for performing memory operations in a hierarchical memory assembly, such as any of those described above, it should be noted that various techniques could be employed, either alone or in any combination with one another to implement the methods described above. For example, pre-fetchers could be utilized by any of the controllers 201. That is, a pre-fetcher in controller C1, C2, . . . , CN, examines the access patterns of controllers C0, C1, . . . CN−1 and pre-fetches data that C0, C1, . . . CN−1 are likely to access. In this manner, the data can be pre-fetched to the pseudo-banks of controllers C1, C2, . . . , CN, which results in a reduced need to return 'time to data' information instead of data itself.

Also, each controller 201 can utilize the time to data received from an upstream controller to predict data availability for future requests. In this manner, the controller receiving the request can provide a downstream controller with a time to data information instead of a time to time to data information. Each controller then can periodically adapt and correct based upon the accuracy of its prediction.

An example of performing this prediction is as follows. Using the example assemblies described in FIGS. 2-4C and 7, controller C0 by default has information on the expected latency if data is present in memory segment M0 or any pseudo-bank that C0 is in communication with via bus B0. However, controller C0 does not know the expected latency with regard to data elsewhere and further upstream. Controller C1 on the other hand, has information on latency for memory M1 and pseudo-banks in upstream controller C2. Therefore, controller C1 can continuously generate, update, and transmit the timing information for data to controller C0. This information allows C0 to predict the expected latency for receiving data further upstream. Similarly, controller C2 can continuously generate, update, and transmit the timing information that C2 has but C1 does not have. The form of this information can be a histogram (e.g. latency bins across an address range) or any other condensed form that does not cause overhead on the buses. The transmission of this information can be performed over a separate wire or wires on the controller bus B0, B1, . . . BN as described above. Because this information is in condensed form, its transmission does not take much time. The validity of this information may have a certain window that it is valid during. Thus, the information can be continuously streamed updating the downstream controllers. One example of this information is when it is formed by assigning a count to an accrued latency interval and certain address region (e.g. histogram over latency intervals and address regions). That is, the count is incremented for each level that the data needs to be cascaded down to reach the first latency bin, which would be as if it were present in memory segment M0. Address regions provide association of latency with a data location within the address space. Thus, the downstream controllers can use this information to predict timing based upon the number of bin counts tied to certain address regions and latency intervals.

Controller C1 can monitor the request activity from the controller C0 that is generating requests with the help of the timing information described above. As a result, controller C1 uses this request activity as feedback and performs quality assurance. That is, controller C1 determines whether controller C0's requests to access the data from C1's pseudo-banks and upstream controllers are predicting data availability well or not. So if controller C0's requests result in many returns of time-to-data instead of data itself, then controller C1 can correct the timing information (histogram) by adjusting its counts for certain address regions and latency intervals.

Another example embodiment is to store address maps in controllers 201. Such maps would contain the address distributions among memory segments and pseudo-banks. With these maps, a downstream controller is aware of whether data is in the pseudo-banks of an immediate upstream controller or in its associated memory segment. As a result, the controllers that have such maps can provide more accurate timing information to downstream controllers on the availability of the data beyond their own memory regions and pseudo-banks.

Additionally, dual addressing can be employed. That is, controller C0 presents two addresses. One address is for memory segment M0 and the other address is for the pseudo-banks connected to controller C0 via bus B0. Therefore, a write request and associated data can be written simultaneously to memory segment M0 and the pseudo-banks of controller C1 visible to controller C0. Similarly, simultaneous direct transfer from M0 to pseudo-banks is possible. The data that is returned on a read request to M0 appears on the wires of bus B0 where controller C1 can capture this data and register it in its pseudo-banks. A reverse transaction is also possible, that is from pseudo-banks to M0. If time-to-data is returned from the pseudo-banks instead of data, then C0 can cancel it as described above in the same way it can cancel a write request if no pseudo-bank space is available.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of IC, and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of performing a memory operation, comprising:
   receiving a memory operation request at a first memory controller, the first memory controller in communication with a second memory controller over a controller bus;
   forwarding, by the first memory controller, the memory operation request to the second memory controller via the controller bus; and
   the second memory controller transmitting first information or second information to the first controller via the controller bus depending on a condition of a pseudo-bank of the second memory controller and a type of the memory operation request.

2. The method of claim 1, wherein the type of the memory operation request is a read request.

3. The method of claim 2, wherein the first information is data requested by the read request and the second information is a time of availability of the data.

4. The method of claim 3, further comprising the second memory controller detecting the read request.

5. The method of claim 3, further comprising the second memory controller examining the pseudo-bank for the data, and transmitting the data to the first memory controller if the data is in the pseudo-bank.

6. The method of claim 3, further comprising the second memory controller examining the pseudo-bank for the data, and transmitting the time of availability of the data to the first memory controller if the data is not in the pseudo-bank and is in a memory location associated with the second memory controller.

7. The method of claim 6, wherein the second memory controller predicts the time of availability of the data.

8. The method of claim 6, further comprising the second memory controller extracting the data from the memory location and loading the data into the pseudo-bank, and the first memory controller returning for the data upon expiration of the time indicated in the time of availability of the data.

9. The method of claim 1, wherein the type of the memory operation request is a write request that includes data to write to the pseudo-bank of the second memory controller.

10. The method of claim 9, wherein upon detecting the write request, the second memory controller writes the data to the pseudo-bank if there is room in the pseudo-bank to store the data.

11. The method of claim 10, further comprising the first memory controller writing the data to a memory associated with the first memory controller.

12. The method of claim 9, wherein the first information is a time of availability to perform the write request.

13. The method of claim 12, wherein upon detecting the write request from the first memory controller, the second memory controller transmits the time of availability to perform the write request to the first memory controller if there is not room in the pseudo-bank to store the data.

14. The method of claim 13, wherein upon receiving the time of availability to perform the write request, the first memory controller returns for the data upon expiration of the time of availability for writing the data.

15. An apparatus comprising:
a first memory controller;
a second memory controller in communication with the first memory controller over a controller bus; and
at least one pseudo-bank associated with the second controller, wherein
the first memory controller receives a memory operation request and forwards the memory operation request to the second memory controller via the controller bus, and the second memory controller transmits first information or second information to the first controller via the controller bus depending on a condition of a pseudo-bank of the second memory controller and a type of the memory operation request.

16. The apparatus of claim 15, wherein the type of the memory operation request is a read request.

17. The apparatus of claim 16, wherein the first information is data requested by the read request and the second information is a time of availability of the data.

18. The apparatus of claim 17, further comprising the second memory controller examining the pseudo-bank for the data and transmitting the data to the first memory controller if the data is in the pseudo-bank.

19. The apparatus of claim 17, further comprising the second memory controller examining the pseudo-bank for the data, and transmitting the time of availability of the data to the first memory controller if the data is not in the pseudo-bank and is in a memory location associated with the second memory controller.

20. The apparatus of claim 19, further comprising the second memory controller extracting the data from the memory location and loading the data into the pseudo-bank.

21. The apparatus of claim 20, further comprising the first memory controller returning for the data upon expiration of the time indicated in the time of availability of the data.

22. The apparatus of claim 15, wherein the memory operation request is a write request that includes data to write to the pseudo-bank of the second memory controller, and wherein:
the second memory controller writes the data to the pseudo-bank if there is room in the pseudo-bank to store the data, or
the second memory controller transmits a time of availability to perform the write request to the first memory controller if there is not room in the pseudo-bank to store the data.

* * * * *